(12) United States Patent
Furui

(10) Patent No.: US 8,272,746 B2
(45) Date of Patent: Sep. 25, 2012

(54) PROJECTION DISPLAY APPARATUS AND DISPLAY METHOD

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 511 days.

(21) Appl. No.: 12/539,148

(22) Filed: Aug. 11, 2009

(65) Prior Publication Data
US 2010/0053569 A1   Mar. 4, 2010

(30) Foreign Application Priority Data

Aug. 19, 2008  (JP) ................................. 2008-210803

(51) Int. Cl.
*G03B 21/00*   (2006.01)
(52) U.S. Cl. ........................................... 353/69; 353/70
(58) Field of Classification Search .................... 353/69, 353/70, 122, 121; 250/205, 214
See application file for complete search history.

(56) References Cited

U.S. PATENT DOCUMENTS

| | | | |
|---|---|---|---|
| 6,947,610 B2 * | 9/2005 | Sun | 382/293 |
| 7,347,564 B2 * | 3/2008 | Matsumoto et al. | 353/69 |

FOREIGN PATENT DOCUMENTS

| | | |
|---|---|---|
| CN | 1738441 A | 2/2006 |
| JP | A-2006-060447 | 3/2006 |

OTHER PUBLICATIONS

English-language Abstract of EP 1628259 A1.

* cited by examiner

*Primary Examiner* — Que T Le
*Assistant Examiner* — Jerry Brooks
(74) *Attorney, Agent, or Firm* — Oliff & Berridge, PLC

(57) ABSTRACT

A projection display apparatus for displaying an image on a projection plane by projection, includes: an image capturing unit capturing an image; an angle calculator calculating an angle of the projection plane relative to the projection display apparatus; a straight line detector detecting a straight line in the captured image corresponding to a line perpendicular to a predetermined reference plane and a straight line in the captured image corresponding to a line parallel to the predetermined reference plane on the basis of the calculated angle; and a keystone corrector correcting a keystone distortion of an image to be displayed on the projection plane on the basis of the detection result in the straight line detector.

9 Claims, 15 Drawing Sheets

PROJECTION DISPLAY APPARATUS AND DISPLAY METHOD

BACKGROUND

1. Technical Field

The present invention relates to a projection display apparatus and a display method, and more particularly, to a technique of correcting a keystone distortion of an image displayed on a projection plane in a projection display apparatus and a display method.

2. Related Art

When an image is displayed on a screen using a projector, a keystone distortion may occur in the image (hereinafter, referred to as "display image") displayed on the screen depending on the angle of the screen relative to the projector. In this case, a technique of making a keystone correction for correcting the keystone distortion of the display image is known.

The keystone correction is made by capturing a screen with an image capturing unit such as a CCD camera, detecting the images of frame sides of the screen from the captured image, and reducing and forming an image in a keystone form on a liquid crystal panel of the projector on the basis of the detected image of the frame sides of the screen. (for example, see JP-A-2006-60447).

However, in the above-mentioned technique, there is a problem that an image (for example, an image of a fluorescent lamp or the like reflected in a screen), which is not actually the image of any of the frame sides of the screen, may be erroneously detected as the image of the frame side from a captured image and thus the keystone correction is not properly performed.

This problem is common to keystone corrections of images in general projection display apparatuses displaying an image on a projection plane by projection, as well as the keystone correction at the time of displaying an image on the screen by the use of a projector.

SUMMARY

An advantage of some aspects of the invention is to improve precision in the keystone correction of an image displayed by projection.

The invention can be embodied as the following aspects or embodiments.

A first aspect of the invention is directed to a projection display apparatus for displaying an image on a projection plane by projection, including: an image capturing unit capturing an image; an angle calculator calculating an angle of the projection plane relative to the projection display apparatus; a straight line detector detecting a straight line in the captured image corresponding to a line perpendicular to a predetermined reference plane and a straight line in the captured image corresponding to a line parallel to the predetermined reference plane on the basis of the calculated angle; and a keystone corrector correcting a keystone distortion of an image to be displayed on the projection plane on the basis of the detection result in the straight line detector.

In this projection display apparatus, the relative angle of the projection plane and the projection display apparatus is calculated, the straight line in the captured image corresponding to the line perpendicular to a predetermined reference plane and the straight line in the captured image corresponding to the line parallel to the predetermined reference plane are detected on the basis of the calculated angle, and the keystone distortion of the image displayed on the projection plane is corrected on the basis of the detection result. Accordingly, it is possible to reduce the possibility of erroneous detection of a desired straight line, thereby improving the precision in the keystone correction of an image displayed by projection.

A second aspect of the invention is directed to the projection display apparatus of the first aspect, wherein the straight line detector includes a vanishing point calculator calculating a vertical vanishing point through which a straight line in the captured image corresponding to a line perpendicular to the predetermined reference plane passes and a horizontal vanishing point through which a straight line in the captured image corresponding to a line parallel to the predetermined reference plane passes on the basis of the calculated angle.

In this projection display apparatus, the vertical vanishing point, through which the straight line in the captured image corresponding to a line perpendicular to a predetermined reference plane, should pass and the horizontal vanishing point, through which the straight line in the captured image corresponding to a line parallel to the predetermined reference plane, should pass are calculated on the basis of the relative angle of the projection plane and the projection display apparatus and the straight lines in the captured image can be detected on the basis of the vertical vanishing point and the horizontal vanishing point. Accordingly, it is possible to reduce the possibility of erroneous detection of a desired straight line, thereby improving the precision in keystone correction of an image displayed by projection.

A third aspect of the invention is directed to the projection display apparatus of the second aspect, wherein the line perpendicular to the predetermined reference plane is at a left side and a right side of a frame of the projection plane, and the line parallel to the predetermined reference plane is a top side and a bottom side of the frame of the projection plane, and the straight line detector detects the straight lines in the captured image corresponding to the left side and the right side from the straight lines passing through the vertical vanishing point in the captured image by selection and detects the straight lines in the captured image corresponding to the top side and the bottom side from the straight lines passing through the horizontal vanishing point in the captured image by selection.

In this projection display apparatus, the straight lines in the captured image corresponding to the left side and the right side are detected from the straight lines passing through the vertical vanishing point in the captured image by selection and the straight lines in the captured image corresponding to the top side and the bottom side are detected from the straight lines passing through the horizontal vanishing point in the captured image by selection. Accordingly, it is possible to reduce the possibility of erroneous detection of the sides of the projection plane, thereby improving the precision in the keystone correction of an image displayed by projection.

A fourth aspect of the invention is directed to the projection display apparatus of the third aspect, wherein the straight line detector detects, as the straight lines corresponding to the left side and the right side, two straight lines having the largest integrated value of values correlated with an edge amount along the corresponding straight line out of the straight lines passing through the vertical vanishing point in the captured image and detects, as the straight lines corresponding to the top side and the bottom side, two straight lines having the largest integrated value of values correlated with an edge amount along the corresponding straight line out of the straight lines passing through the horizontal vanishing point in the captured image.

In this projection display apparatus, it is possible to improve the precision with which the straight lines corresponding to the sides of the projection plane are detected, thereby improving the precision in the keystone correction of an image displayed by projection.

A fifth aspect of the invention is directed to the projection display apparatus of any one of the first to fourth aspects, wherein the angle calculator may include: a measuring point position detector detecting positions of three or more predetermined measuring points on the projection plane relative to the projection display apparatus; and a plane calculator calculating an approximate plane approximating the projection plane on the basis of the positions of the predetermined measuring points.

In this projection display apparatus, it is possible to simply calculate the relative angle of the projection plane and the projection display apparatus on the basis of the plane approximating the projection plane.

A sixth aspect of the invention is directed to the projection display apparatus of the fifth aspect, wherein the angle calculator may further include a pattern projector projecting a predetermined pattern image including three or more reference points onto the projection plane, and the predetermined measuring points may be the reference points of the pattern image displayed on the projection plane.

In this projection display apparatus, it is possible to simply calculate the plane approximating the projection plane.

A seventh aspect of the invention is directed to the projection display apparatus of any one of the first to sixth aspects, wherein the predetermined reference plane may be a plane having a predetermined relation with the projection display apparatus.

In this projection display apparatus, the straight lines in the captured image corresponding to the lines perpendicular and parallel to the plane having a predetermined relation with the projection display apparatus are detected and the keystone distortion of an image displayed on the projection plane is corrected on the basis of the detection result. Accordingly, it is possible to reduce the possibility of erroneous detection of the straight lines perpendicular and parallel to the plane having a predetermined relation with the projection display apparatus, thereby improving the precision in the keystone correction of an image displayed by projection.

An eighth aspect of the invention is directed to the projection display apparatus of the seventh aspect, wherein the predetermined reference plane may be an installation plane of the projection display apparatus.

In this projection display apparatus, the straight lines in the captured image corresponding to the lines perpendicular and parallel to the installation plane of the projection display apparatus are detected and the keystone distortion of an image displayed on the projection plane is corrected on the basis of the detection result. Accordingly, it is possible to reduce the possibility of erroneous detection of the straight lines perpendicular and parallel to the installation plane of the projection display apparatus, thereby improving the precision in the keystone correction of an image displayed by projection.

A ninth aspect of the invention is directed to the projection display apparatus of any one of the first to eighth aspects, which further includes: a light source unit emitting light; and an image forming panel unit forming an effective panel image, which is used to modulate the light emitted from the light source unit to an effective image beam indicating an image, in an image forming area of a panel surface. The keystone corrector corrects the keystone distortion of the image displayed on the projection plane by calculating a post-correction image forming area, which is a partial area of the image forming area, and forming the effective panel image in the post-correction image forming area of the image forming area on the basis of the detection result in the straight line detector.

In this projection display apparatus, it is possible to make a keystone correction of an image displayed by projection with high precision on the basis of the detection result in the straight line detector.

The invention can be embodied in various forms and can be embodied, for example, in the form of a projection display apparatus, a display method, an image processing method and apparatus, an image correcting method and apparatus, a computer program for executing the methods or the functions of the apparatuses, a recording medium having the computer program recorded thereon, a data signal including the computer program and being embodied in carrier waves, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described in the following order:
A. First Embodiment;
A-1. Configuration of Projector;
A-2. Keystone Correcting Process;
B. Second Embodiment; and
C. Modified Examples.

A. First Embodiment

A-1. Configuration of Projector

Figure 1:
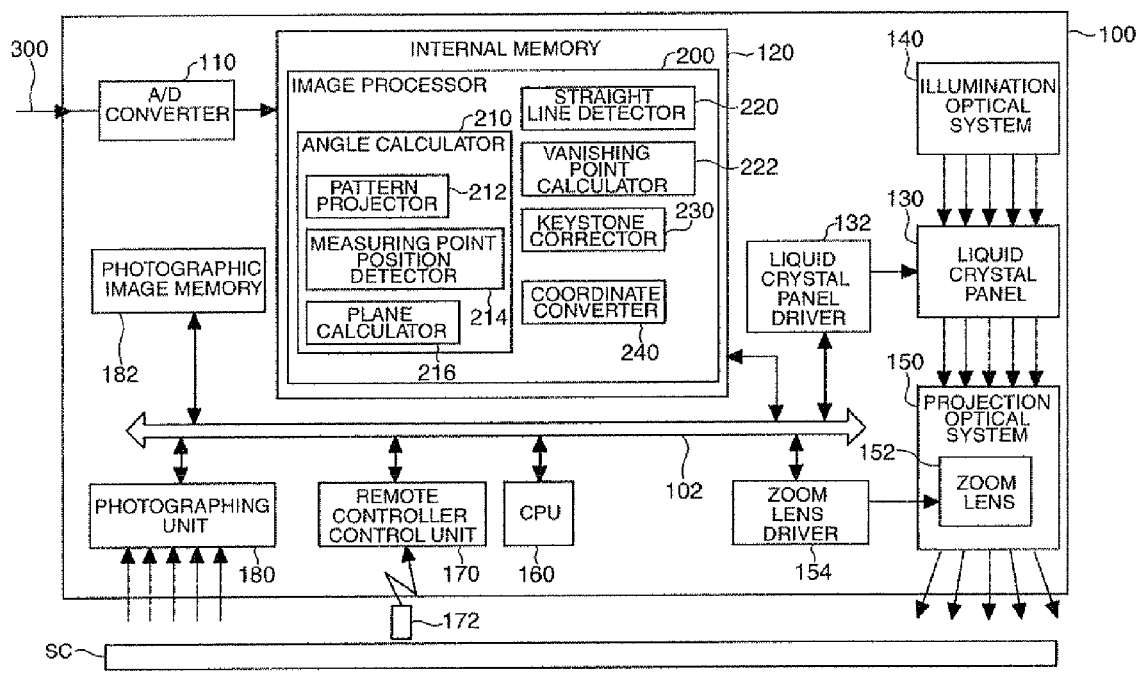
FIG. 1 is a block diagram schematically illustrating the configuration of a projector as a projection display apparatus according to a first embodiment of the invention.

FIG. 1 is a block diagram schematically illustrating the configuration of a projector as a projection display device according to a first embodiment of the invention. The projector 100 projects an image beam indicating an image and displays the image (hereinafter, referred to as "display image") on a projection plane such as a screen SC. In this embodiment, it is assumed that the screen SC is rectangular and has a black frame along its periphery.

The projector 100 includes an A/D converter 110, an internal memory 120, a liquid crystal panel 130, a liquid crystal panel driver 132, an illumination optical system 140, a projection optical system 150 having a zoom lens 152, a zoom lens driver 154, a CPU 160, a remote controller control unit 170, a remote controller 172, an image capturing unit 180, and a captured image memory 182. The elements of the projector 100 are connected to each other via a bus 102.

The A/D converter 110 performs an A/D conversion process on an input image signal input via a cable 300 from a DVD player or a PC (Personal Computer) (not shown) as needed and outputs a digital image signal.

A computer program serving as an image processor 200 is stored in the internal memory 120. The image processor 200 adjusts an image display state (such as brightness, contrast, synchronization, tracking, color darkness, and color tone) of the digital image signal output from the A/D converter 110 and then outputs the digital image signal to the liquid crystal panel driver 132. The image processor 200 includes, as modules, an angle calculator 210, a straight line detector 220, a vanishing point calculator 222, a keystone corrector 230, and a coordinate converter 240. The angle calculator 210 includes a pattern projector 212, a measuring point position detector 214, and a plane calculator 216. The functions of the individual sections and the keystone correcting process will be described in detail later.

The liquid crystal panel driver 132 drives the liquid crystal panel 130 on the basis of the digital image signal input from the image processor 200. The liquid crystal panel 130 forms an image (hereinafter, referred to as "effective panel image PI"), which is used to modulate an illuminating beam emitted from the illumination optical system 140 to an effective image beam indicating an image, in an image forming area IF of the surface of the liquid crystal panel 130 (hereinafter, referred to as "panel plane").

Figure 2A:
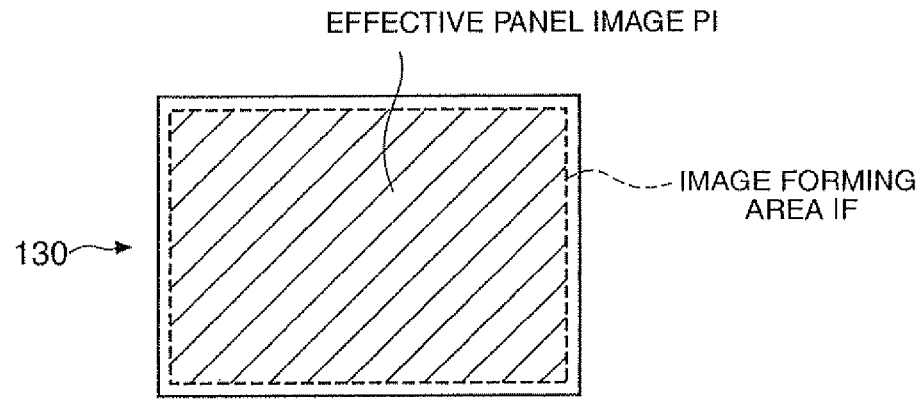
FIGS. 2A, 2B and 2C are diagrams schematically illustrating the relation of a liquid crystal panel and an image forming area.
Figure 2B:
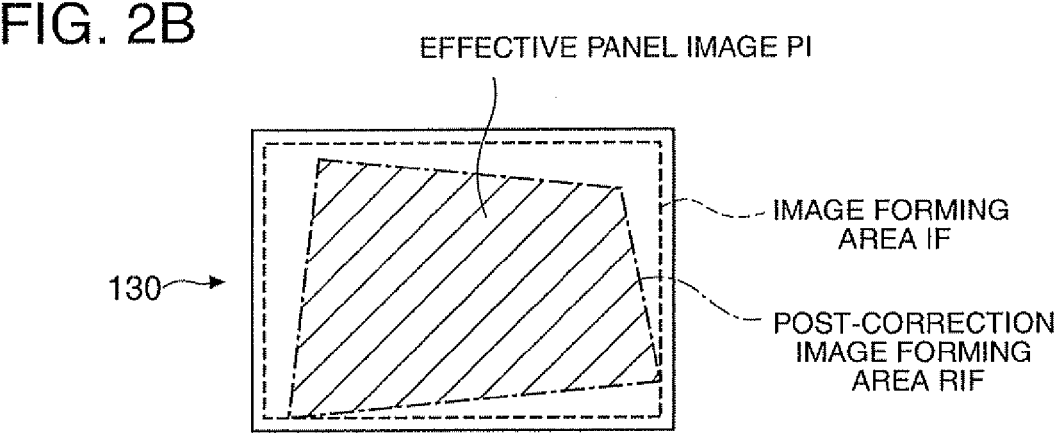
Figure 2C:
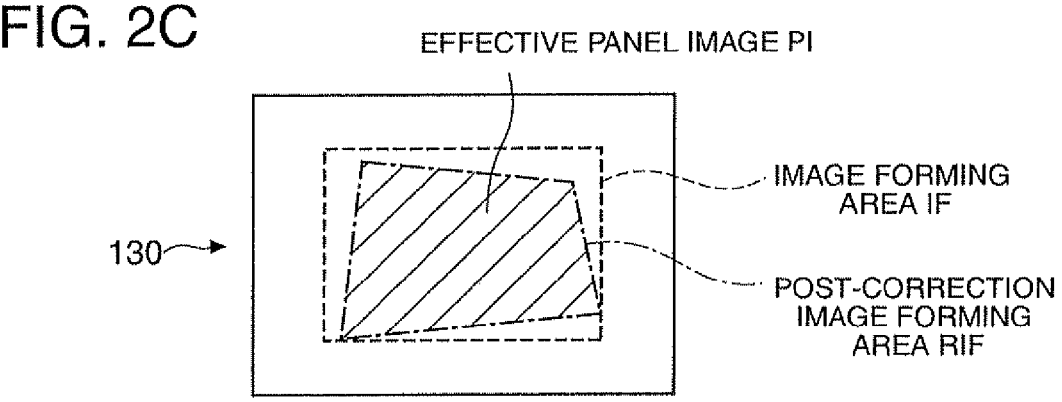

FIGS. 2A, 2B, and 2C are diagrams schematically illustrating the relation between the liquid crystal panel 130 and the image forming area IF. The image forming area IF refers to an area on the panel plane of the liquid crystal panel 130 in which the effective panel image PI can be formed on the basis of the digital image signal input to the liquid crystal panel driver 132. In FIGS. 2A, 2B, and 2C, the image forming area IF is shown as an area surrounded by a broken line. As shown in FIG. 2A, the image forming area IF in this embodiment is set as an area respectively smaller by two dots than four peripheries of the entire surface of the panel plane of the liquid crystal panel 130. The image forming area IF can be set to any size relative to the entire surface of the panel plane of the liquid crystal panel 130.

In FIGS. 2A, 2B, and 2C, the area in which the effective panel image PI is formed is hatched. In general, as shown in FIG. 2A, the effective panel image PI is formed in the entire area of the image forming area IF. However, at the time of performing a keystone correcting process, to be described later in detail, as shown in FIG. 2B, the effective panel image PI may be formed in a partial area of the image forming area IF of the liquid crystal panel 130 and a black image (shown as white in FIG. 2B) can be formed in all the other areas of the image forming area IF. The partial area of the image forming area IF in which the effective panel image PI is formed at the time of correcting a keystone distortion is referred to as "post-correction image forming area RIF". In FIGS. 2A, 2B, and 2C, the post-correction image forming area RIF is shown as an area surrounded with a dashed-dotted line.

For example, when the resolution of the digital image signal input to the liquid crystal panel driver 132 is smaller than that of the liquid crystal panel 130 and the input digital image is formed on the liquid crystal panel 130 without being enlarged, as shown in FIG. 2C, the image forming area IF is set to an area smaller than the entire area of the panel plane of the liquid crystal panel 130 to correspond to the ratio of both resolutions.

The projection optical system 150 (see FIG. 1) is attached to the front surface of the chassis of the projector 100 and enlarges and projects the light modulated to the image beam by the liquid crystal panel 130. The zoom lens driver 154 drives the zoom lens 152 of the projection optical system 150 to change the zoom state. Here, the zoom state means a degree of enlargement (magnification) for projecting the light passing through the liquid crystal panel 130 in the projection optical system 150. That is, the zoom lens driver 154 can drive the zoom lens 152 in order to change the size of the display image to be displayed on the screen SC.

The remote controller control unit 170 receives an instruction from a user with a remote controller 172 and transmits the instruction to the CPU 160 through the bus 102. In this embodiment, the projector 100 receives the user's instruction using the remote controller 172 and the remote controller control unit 170, but the user's instruction may be received using other configurations such as an operation panel.

The CPU 160 projects an image onto the screen SC or performs an image process such as a keystone correcting process to be described later, by reading and executing the computer program as the image processor 200 from the internal memory 120. The CPU 160 controls the overall projector 100.

The image capturing unit 180 includes a CCD camera and captures an image. The installation position or the angle view of the image capturing unit 180 is set to capture the entire area, which an image is projected onto, corresponding to the maximum image forming area IF (see FIG. 2A) of the liquid crystal panel 130. The captured image generated by the image capturing unit 180 is stored in the captured image memory 182. The image capturing unit 180 may include another capturing device instead of the CCD camera.

A-2. Keystone Correcting Process

Figure 3:
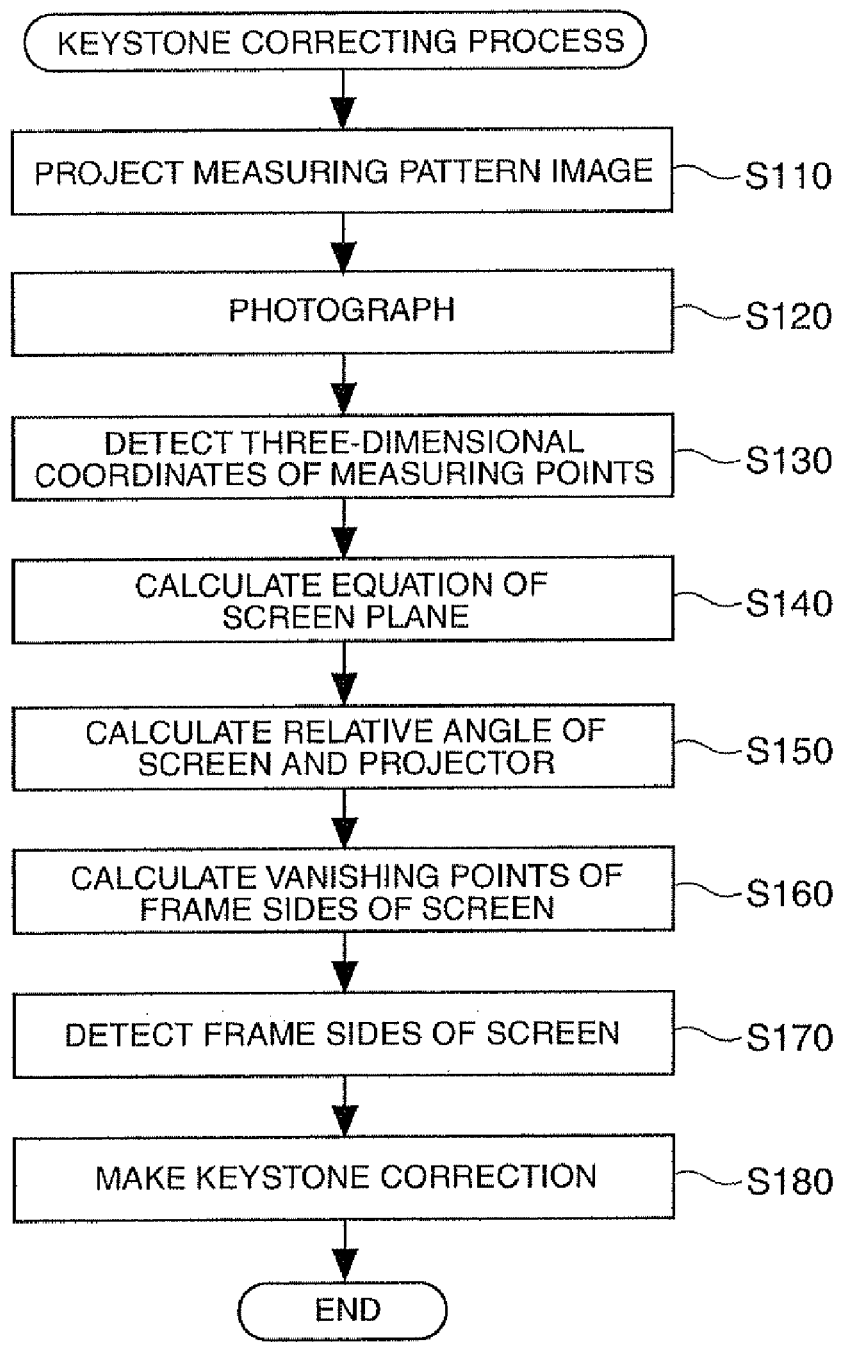
FIG. 3 is a flowchart illustrating a flow of a keystone correcting process of the projector according to the first embodiment of the invention.

FIG. 3 is a flowchart illustrating a flow of the keystone correcting process in the projector 100 according to the first embodiment. The keystone correcting process is a process of correcting the keystone distortion of the display image so that the peripheral sides of the display image on the screen SC are parallel to the sides of the frame of the screen SC. The keystone correcting process is performed in response to instructions sent by the user with the remote controller 172. The keystone correcting process may be automatically performed, for example, in response to the power-on or the input of an image signal.

Figure 4A:
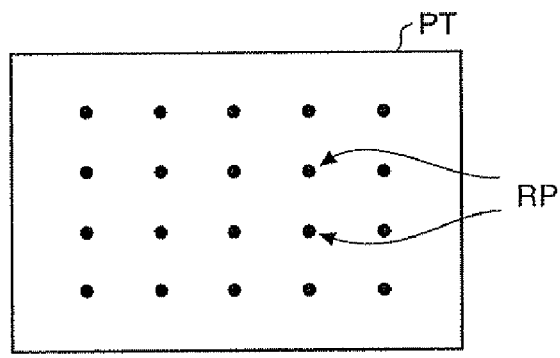
FIGS. 4A, 4B, 4C, and 4D are diagrams illustrating examples of a measuring pattern image.
Figure 4B:
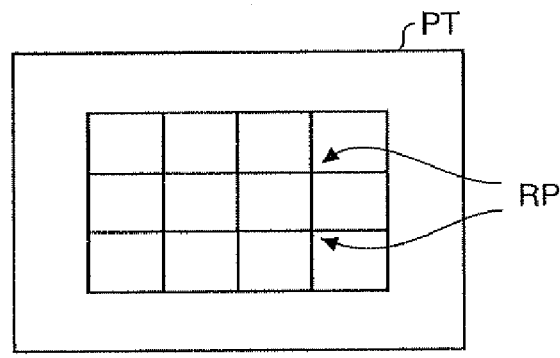
Figure 4C:
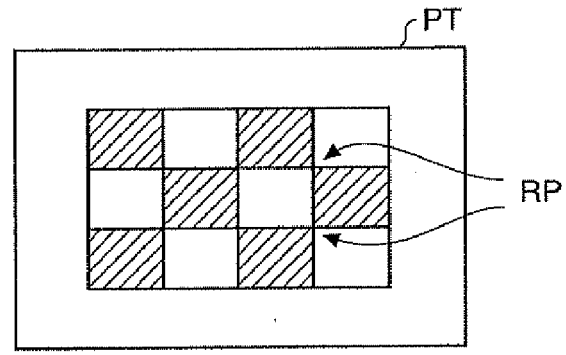
Figure 4D:
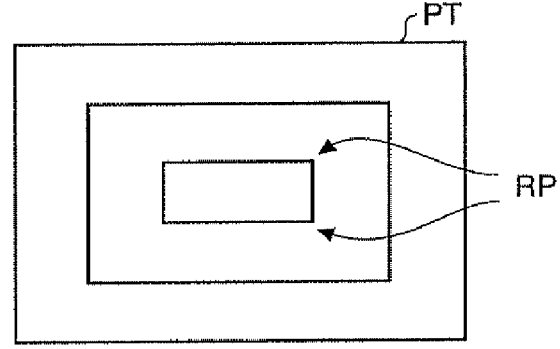

In step S110, the pattern projector 212 (see FIG. 1) forms a measuring pattern image PT on the liquid crystal panel 130 and allows the illumination optical system 140 and the projection optical system 150 to project an image beam to the screen SC. Image data of the measuring pattern image PT is stored in a predetermined area of the internal memory 120. FIGS. 4A, 4B, 4C, and 4D are diagrams illustrating examples of the measuring pattern image PT. The measuring pattern image PT includes plural reference points RP. The measuring pattern image PT shown in FIG. 4A is an image including plural white dots arranged in a lattice form on a black background where the dots are set as the reference points RP. The measuring pattern image PT shown in FIG. 4B is an image in which white grid shapes are arranged on a black background and intersections between the vertical lines and the horizontal lines of the grids are set as the reference points RP. The measuring pattern image PT shown in FIG. 4C is a checkered image in which a black area and a white area are alternately arranged and where the vertexes of each area are set as the reference points RP. The measuring pattern image PT shown in FIG. 4D is an image having a small white rectangle in a black background and a large white rectangle including the small rectangle and vertexes of each rectangle are set as the reference points RP. When the measuring pattern image PT is an image (excluding an image in which all the reference points RP exist in one straight line) including three or more reference points RP, an image other than the image shown in FIGS. 4A, 4B, 4C, and 4D may be employed. However, it is preferable that the number of reference points RP included in the measuring pattern image PT is great, from the viewpoint of improvement in precision for calculating an approximate plane equation of the screen SC to be described later.

In step S120 (see FIG. 3), the capturing unit 180 (see FIG. 1) captures the screen SC onto which the measuring pattern image PT is projected and generates a captured image CI. The generated captured image CI is stored in the captured image memory 182.

In step S130 (see FIG. 3), the measuring point position detector 214 (see FIG. 1) detects three-dimensional coordinates of predetermined measuring points on the basis of the captured image CI. The three-dimensional coordinates of the predetermined measuring points are detected to calculate the three-dimensional coordinates (equation of the approximate plane of the screen SC) of the approximate plane of the screen SC.

Figure 5:
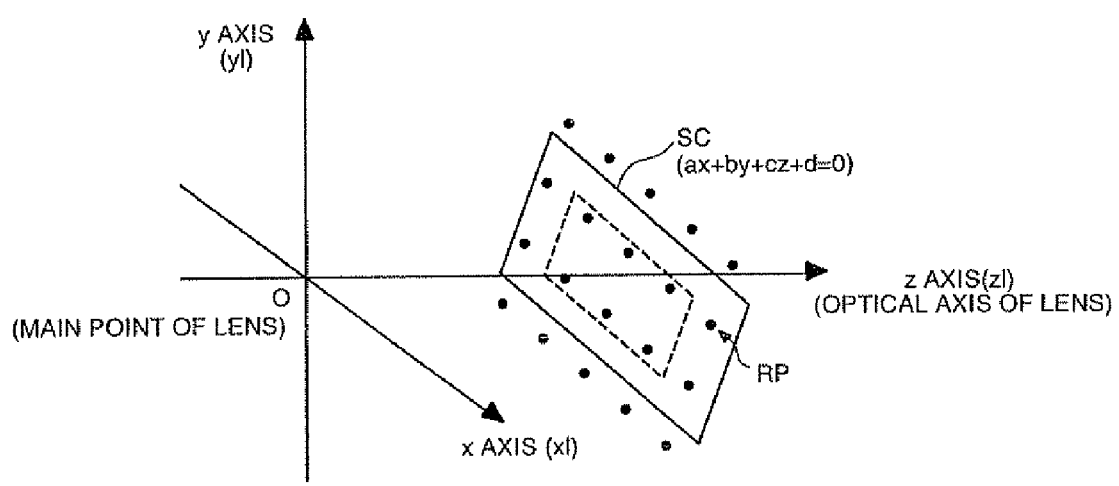
FIG. 5 is a diagram schematically illustrating an operation of detecting a three-dimensional coordinate of a predetermined measuring point.

FIG. 5 is a diagram schematically illustrating the detection of the three-dimensional coordinates of the predetermined measuring points. In this embodiment, the three-dimensional coordinates of the measuring points are detected in a three-dimensional coordinate system (hereinafter, referred to as "lens coordinate system") using the main point of the zoom lens 152 as an origin and the optical axis of the zoom lens 152 as the z axis (z1 axis). That is, the positions of the measuring points relative to the projector 100 are detected.

In FIG. 5, the screen SC onto which the measuring pattern image PT (see FIG. 4A) is projected is shown in the lens coordinate system. The measuring points from which the three-dimensional coordinates should be detected are reference points RP included in the measuring pattern image PT displayed on the screen SC or on an object (for example, a wall surface) in the back of the screen SC. In the state shown in FIG. 5, some of the reference points RP are reflected in the screen SC whereas the other reference points protrude from the screen SC and are reflected in the wall surface in the back of the screen SC.

The measuring point position detector 214 detects the positions of the reference points RP in the captured image CI by analyzing the captured image CI and detects the three-dimensional coordinates of the detected reference points RP in the lens coordinate system. The three-dimensional coordinates of the measuring points are detected by an active-stereo method using the disparity between the zoom lens 152 and the image capturing unit 180 and detecting three-dimensional coordinates using the principle of triangulation. The method used to detect the three-dimensional coordinates of the measuring points may employ a three-dimensional coordinate detecting method (for example, a passive-stereo method using plural cameras) other than the active-stereo method. The coordinate system used to detect the three-dimensional coordinates of the measuring points may be a coordinate system (for example, a camera coordinate system) other than the lens coordinate system.

In step S140 (see FIG. 3), the plane calculator 216 (see FIG. 1) calculates an equation of the approximate plane of the screen SC on the basis of the detected three-dimensional coordinates of the measuring points. Specifically, the plane calculator 216 calculates the equation of the approximate plane of the screen SC by the least-square method using the three-dimensional coordinates of the reference points RP (surrounded with the broken lines in FIG. 5) located at the center of the measuring pattern image PT. Only the reference points RP located at the center of the measuring pattern image PT are used to exclude the points not located on the screen SC as much as possible. The equation of the approximate plane of the screen SC is expressed in the form of $ax+by+cz+d=0$ as shown in FIG. 5. Here, a vector $(a, b, c)$ is a normal vector of the approximate plane of the screen SC.

The equation of the approximate plane of the screen SC can be calculated only if the three-dimensional coordinates of three or more reference points RP, not located in a straight, are detected. Therefore, the number of reference points RP used to calculate the equation of the approximate plane of the screen SC can be set to any number of 3 or higher. Accordingly, in detecting the three-dimensional coordinates of the measuring points (step S130 in FIG. 3), the three-dimensional coordinates of all the reference points RP included in the measuring pattern image PT need not be detected and the three-dimensional coordinates of only the reference points RP (for example, the reference points RP located at the center of the measuring pattern image PT) used to calculate the equation of the approximate plane of the screen SC can be sufficiently detected. Alternatively, the three-dimensional coordinates of all the reference points RP included in the measuring pattern image PT may be detected, it may be then determined whether the reference points RP are reflected in the screen SC on the basis of the three-dimensional coordinates, and the equation of the approximate plane of the screen SC may be calculated using the reference points RP determined as the points reflected in the screen SC.

Figure 6:
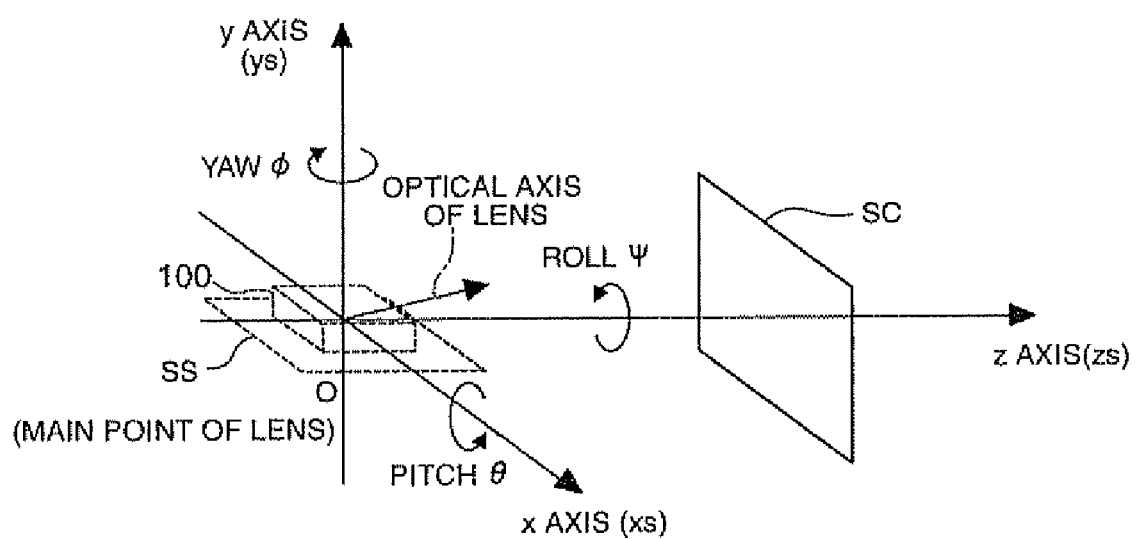
FIG. 6 is a diagram illustrating the concept of a relative angle between a screen and a projector.

In step S150 (see FIG. 3), the angle calculator 210 (see FIG. 1) calculates the relative angle of the screen SC and the projector 100. FIG. 6 is a diagram illustrating the concept of the relative angle of the screen SC and the projector 100. In FIG. 6, the relation of the screen SC and the projector 100 in a three-dimensional coordinate system (hereinafter, referred to as "screen coordinate system") using the main point of the zoom lens 152 as an origin and using the direction perpendicular to the approximate plane of the screen SC as the z axis (zs axis) is shown. In FIG. 6, the projector 100 is placed on an installation plane SS which is a plane perpendicular to the y axis (ys axis). The installation plane SS in this embodiment corresponds to the "reference plane" in the claims.

The relative angle of the screen SC and the projector 100 (the optical axis of the zoom lens 152 of the projector 100) is expressed by combination of a pitch angle θ which is a rotating angle of the projector 100 about the x axis (xs axis), a yaw angle φ which is a rotating angle of the projector 100 about the y axis (ys axis), and a roll angle Ψ which is rotating angle of the projector about the z axis (zs axis). The angle calculator 210 uniquely calculates the relative angle (that is, the values of the pitch angle θ, the yaw angle φ, and the roll angle Ψ) of the screen SC and the projector 100 from the relation (see FIG. 5) of the optical axis of the zoom lens 152 and the approximate plane of the screen SC in the lens coordinate system.

Figure 7A:
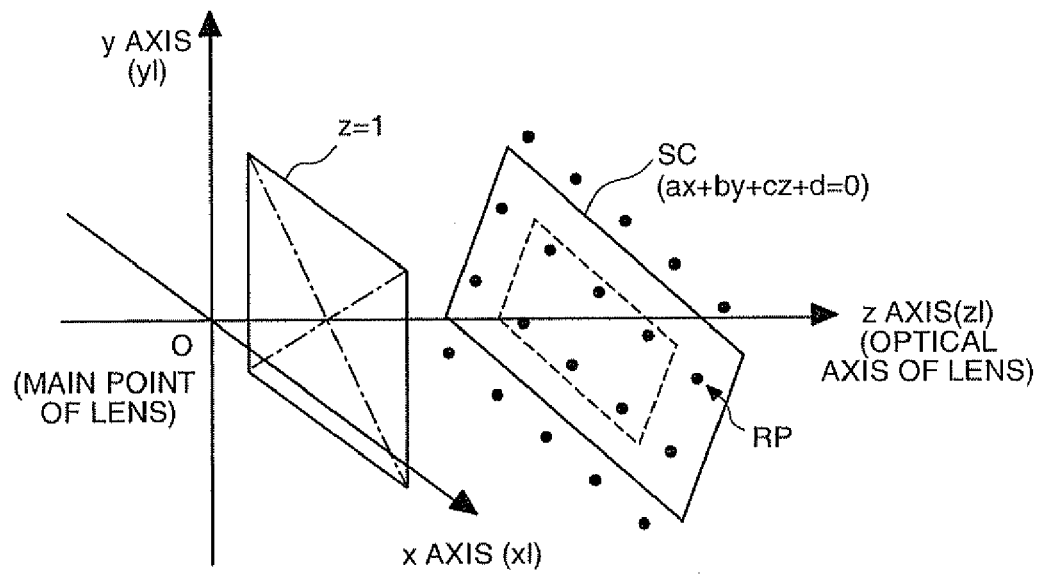
FIGS. 7A and 7B are diagrams schematically illustrating an operation of calculating vanishing points for the frame sides of the screen.
Figure 7B:
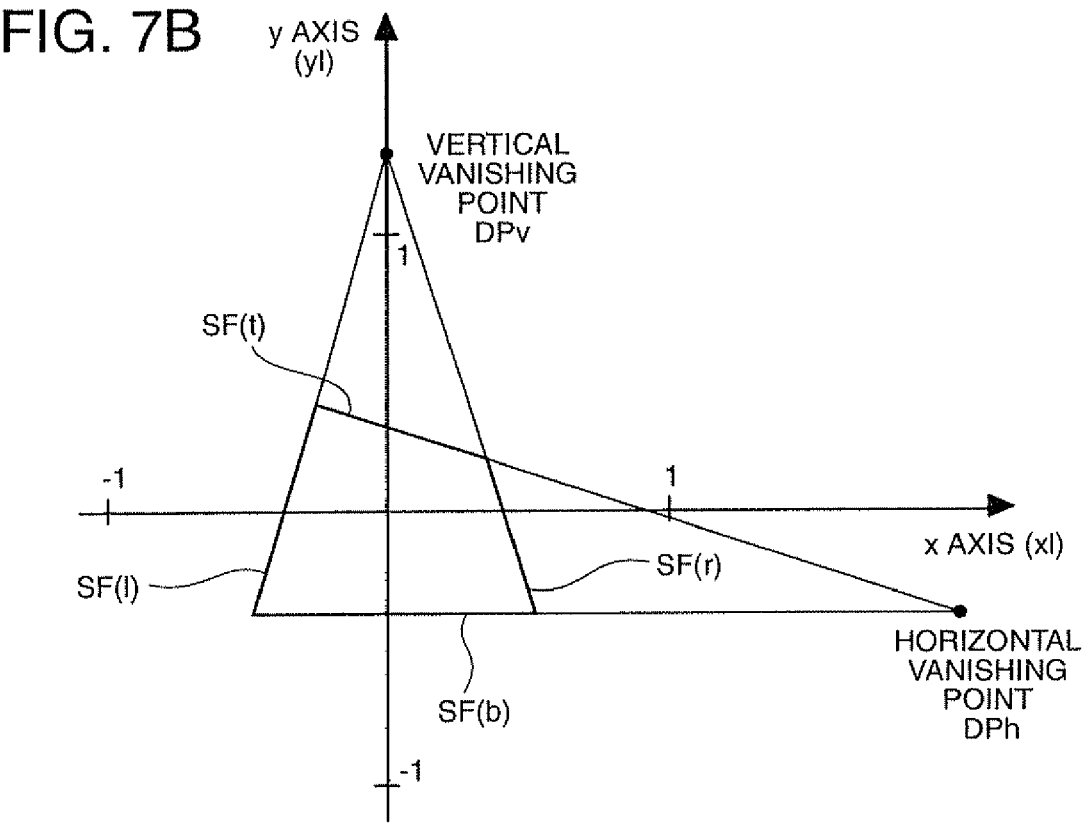

In step S160 (FIG. 3), the vanishing point calculator 222 (see FIG. 1) calculates vanishing points in the captured image CI of the frame sides (sides of the frame of the screen SC) of the screen SC. FIGS. 7A and 7B are diagrams schematically illustrating the calculating of the vanishing points of the frame sides of the screen SC. In FIG. 7A, the approximate plane of the screen SC and the plane (plane z=1) perpendicular to the z axis in the lens coordinate system (see FIG. 5) are shown. In FIG. 7B, projections (intersections between the plane passing through the frame sides of the screen SC and the origin O and plane z=1) of the frame sides of the screen SC onto plane z=1 are shown. The coordinate system shown in FIG. 7B is called the standard coordinate system of the lens coordinate system. Regarding the unit of the standard coordinate system, directions of plus 45 degree and minus 45 degree are plus 1 and minus 1, respectively.

Projections of straight lines parallel to each other onto a plane (for example, plane z=1) in a three-dimensional space (for example, the lens coordinate system) are intersected at one point. This intersection is called the vanishing point. Since the right side SF(r) and the left side SF(l) of the frame sides of the screen SC in the lens coordinate system are parallel to each other, the projections of the right side SF(r) and the left side SF(l) in the standard coordinate system are intersected at a vanishing point (hereinafter, referred to as "vertical vanishing point DPv"). Similarly, since the top side SF(t) and the bottom side SF(b) of the frame sides of the screen SC are parallel to each other in the lens coordinate system, the projections of the top side SF(t) and the bottom side SF(b) in the standard coordinate system are intersected at a vanishing point (hereinafter, referred to as "horizontal vanishing point DPh"). In the following description, the vertical vanishing point DPv and the horizontal vanishing point DPh are simply called "vanishing points DP".

The positions (coordinates) of the vanishing points DP (the vertical vanishing point DPv and the horizontal vanishing point DPh) are uniquely determined by the relative angle (the pitch angle θ, the yaw angle φ, and the roll angle Ψ) of the screen SC and the projector 100. The coordinates of the vanishing points DP in the standard coordinate system of the lens coordinate system are expressed by Expressions (1) and (2).

$$DPv = \left( \frac{\sin\psi \cdot \cos\phi}{\sin\psi \cdot \sin\phi \cdot \cos\theta + \cos\psi \cdot \sin\theta}, \frac{-\sin\psi \cdot \sin\phi \cdot \sin\theta + \cos\psi \cdot \cos\theta}{\sin\psi \cdot \sin\phi \cdot \cos\theta + \cos\psi \cdot \sin\theta} \right) \quad (1)$$

$$DPh = \left( \frac{\cos\psi \cdot \cos\phi}{\cos\psi \cdot \sin\phi \cdot \cos\theta - \sin\psi \cdot \sin\theta}, \frac{-\cos\psi \cdot \sin\phi \cdot \sin\theta - \sin\psi \cdot \cos\theta}{\cos\psi \cdot \sin\phi \cdot \cos\theta - \sin\psi \cdot \sin\theta} \right) \quad (2)$$

When the roll angle Ψ is zero, the coordinates of the vanishing points DP in the standard coordinate system of the lens coordinate system are expressed by Expressions (3) and (4).

$$DPv = \left( 0, \frac{1}{\tan\theta} \right) \quad (3)$$

$$DPh = \left( \frac{1}{\tan\phi \cdot \cos\theta}, -\tan\theta \right) \quad (4)$$

Figure 8:
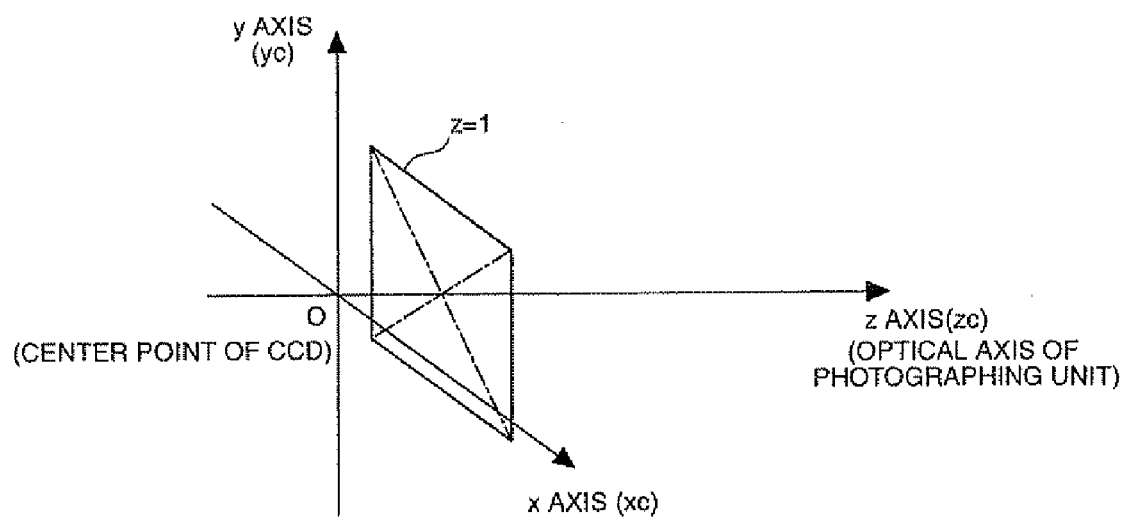
FIG. 8 is a diagram illustrating a camera coordinate system.

The coordinates calculated by Expressions (1) to (4) are the coordinates of the vanishing points DP in the standard coordinate system of the lens coordinate system. Since the detection (step S170 of FIG. 3) of the frame sides of the screen SC is performed in the standard coordinate system of the camera coordinate system, the coordinate converter 240 (see FIG. 1) performs the coordinate conversion from the standard coordinate system (see FIG. 7B) of the lens coordinate system to the standard coordinate system of the camera coordinate system by projection conversion. FIG. 8 is a diagram illustrating the camera coordinate system. The camera coordinate system is a three-dimensional coordinate in which a center point of CCD of the image capturing unit 180 is set to an origin O and the optical axis of the lens of the image capturing unit 180 is set to the z axis (zc axis). The standard coordinate system of the camera coordinate system is a coordinate system in which a point or a line, or a plane in the camera coordinate system is expressed by projections onto the plane (plane z=1) perpendicular to the z axis. Regarding the unit of the standard coordinate system, directions of plus 45 degree and minus 45 degree are plus 1 and minus 1, respectively.

This coordinate conversion is performed to compensate for a difference between the optical axis of the zoom lens 152 of the projector and the optical axis of a lens of the image capturing unit 180 in the projector 100. That is, the above-mentioned coordinates of the vanishing points DP (the vertical vanishing point DPv and the horizontal vanishing point DPh) are coordinates in the standard coordinate system of the lens coordinate system and the coordinates of the vanishing points DP in the captured image CI are calculated by the coordinate conversion.

The coordinate converter 240 performs the coordinate conversion (projection conversion) using a matrix M. The matrix M is expressed by M=R(E+tn) where R represents a three-dimensional rotation matrix indicating the relative rotation amount of the zoom lens 152 and the image capturing unit 180, t represents a three-dimensional column vector indicating the relative translation amount of the zoom lens 152 and the image capturing unit 180, n=(a, b, c) represents a three-dimensional row vector when the equation of the approximate plane of the screen SC is expressed by ax+by+cz=1 and E represents a three-dimensional unit matrix. In this embodiment, the coordinate conversion (projection conversion) by the coordinate converter 240 is performed using the matrix M calculated on the basis of the relative relation of the zoom lens 152 and the image capturing unit 180, but the projection conversion may be performed by calculating the optimal projection conversion by the least-square method from the correspondence between the coordinates of the reference points RP in the lens coordinate system and the coordinates of the reference points in the camera coordinate system.

Figure 9:
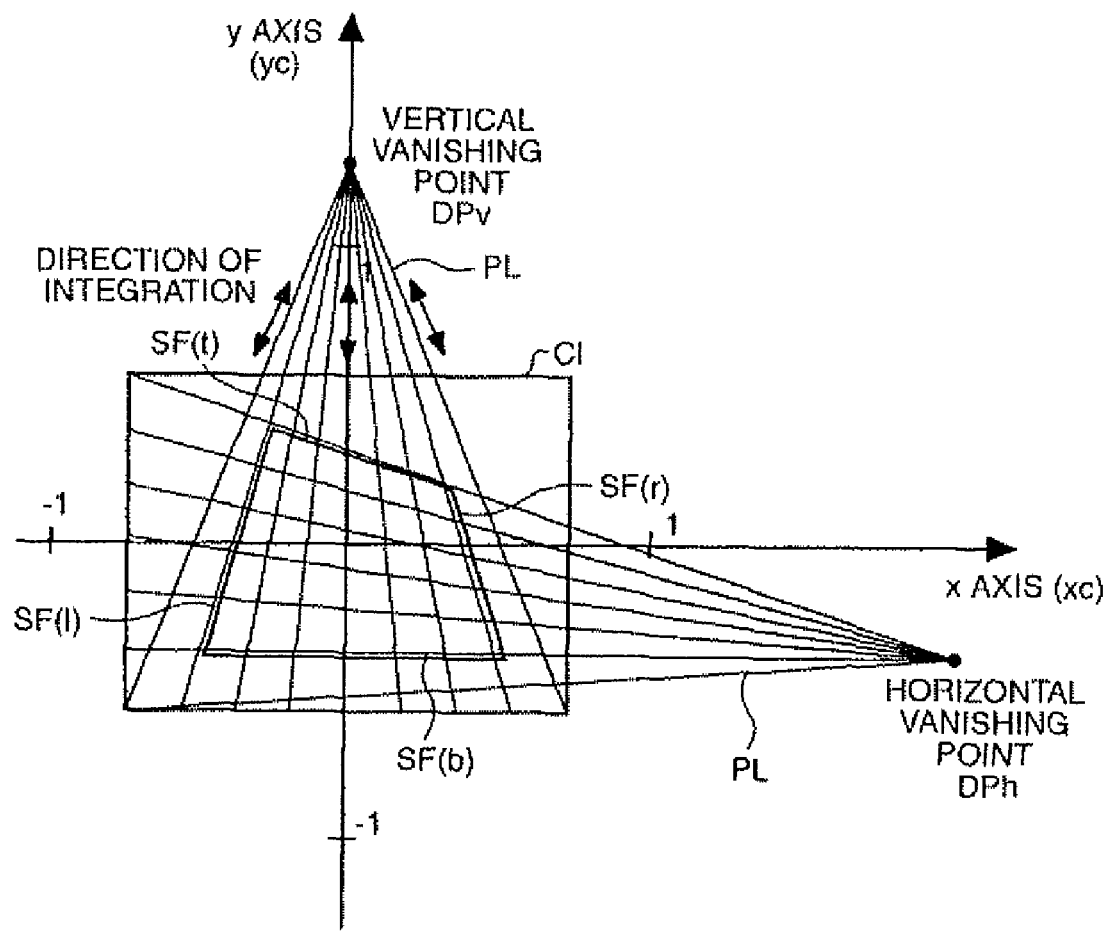
FIG. 9 is a diagram illustrating a method of detecting the frame sides of the screen from a captured image.

In step S170 (FIG. 3), the straight line detector 220 (see FIG. 1) detects the frame sides (the right side SF(r), the left side SF(l), the top side SF(t), and the bottom side SF(b)) of the screen SC reflected in the captured image CI. FIG. 9 is a diagram illustrating the method of detecting the frame sides of the screen SC from the captured image CI. In FIG. 9, the captured image CI and the vanishing points DP (the vertical vanishing point DPv and the horizontal vanishing point DPh) in the standard coordinate system of the camera coordinate system are shown.

The straight line detector 220 sets plural straight lines (hereinafter, also referred to as "vanishing point-passing straight line PL") passing through the vanishing points DP so as to detect the frame sides of the screen SC. Specifically, the plural straight lines which pass through the vanishing points D and have slopes different by a predetermined pitch angle are set as the vanishing point-passing straight lines PL for each of the vertical vanishing points DPv and the horizontal vanishing points DPh. The method of setting the vanishing point-passing straight line PL is not limited to this method. For example, plural reference pixels with an interval of a predetermined number of pixels may be set in a predetermined straight line (for example, each side of the captured image CI) and plural straight lines connecting the reference pixels to the vanishing points DP may be set as vanishing point-passing straight lines PL.

Figure 10:
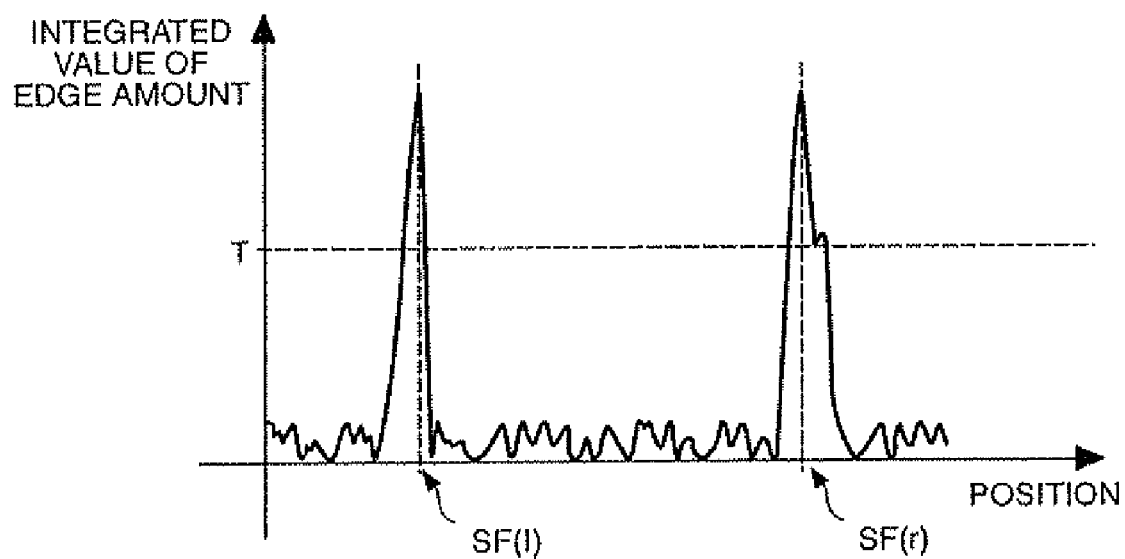
FIG. 10 is a diagram illustrating an example of a histogram of edge-amount integrated values.

Then, the straight line detector 220 integrates an edge amount along the vanishing point-passing straight lines PL set on the captured image CI by the use of an outline extracting filter such as a differential filter or a Laplacian filter and prepares a histogram. FIG. 10 is a diagram illustrating an example of the histogram of the edge amount integrated values. In FIG. 10, the histogram of the edge amount integrated values along the vanishing point-passing straight lines PL passing through the vertical vanishing point DPv is shown. The straight line detector 220 detects the positions indicating the largest two peak values (maximum value) greater than the threshold value T in the histogram of the edge amount integrated values as the positions of two of the frame sides of the screen SC in the captured image CT. In the example shown in FIG. 10, since two peak values greater than a threshold value T exist, the position of the right peak value is detected as the position of the right side SF(r) and the position of the left peak value is detected as the position of the left side SF(l). In the histogram of the edge amount integrated values shown in FIG. 10, for example, when three peak values greater than the threshold value T exist, the positions of the larger two peak values are detected as the positions of the two frame sides. Similarly, the straight line detector 220 detects the positions of the top side SF(t) and the bottom side SF(b) in the captured image CI using the histogram of the edge amount integrated values along the vanishing point-passing straight line PL passing through the horizontal vanishing point DPh. Accordingly, the frame sides of the screen SC in the captured image CI are detected. It is preferable that the outline extracting filter strongly reacting to the outline in the left-right direction (horizontal direction) of the captured image CI is used to integrate the edge amount along the vanishing point-passing straight line PL which passes through the vertical vanishing point DPv. It is preferable that the outline extracting filter strongly reacting to the outline in the up-down direction (vertical direction) of the captured image CI is used to integrate the edge amount along the vanishing point-passing straight line PL which passes through the horizontal vanishing point DPh.

In step S180 (FIG. 3), the keystone corrector 230 (see FIG. 1) makes a keystone correction with reference to the positions of the frame sides of the screen SC detected in the captured image CI. The keystone correction can be carried out using any known method (for example, the method described in JP-A-2006-60447). That is, the coordinates of the frame sides of the screen SC in the standard coordinate system of the camera coordinate system shown in FIG. 9 are converted into the standard coordinate system of the lens coordinate system by the projection conversion. This coordinate conversion is performed using the inverse conversion of the projection conversion used for the coordinate conversion from the standard coordinate system of the lens coordinate system into the standard coordinate system of the camera coordinate system. An area on the liquid crystal panel 130 corresponding to the screen SC is calculated as a post-correction image forming area RIF (see FIGS. 2B and 2C) from the coordinates of the frame sides of the screen SC in the standard coordinate system of the lens coordinate system calculated by the coordinate conversion. Thereafter, by adjusting the zoom state as needed and then forming the effective panel image PI in the post-correction image forming area RIF on the liquid crystal panel 130, the keystone distortion of the image displayed on the screen SC is corrected.

As described above, in the projector 100 according to the first embodiment, the relative angle of the screen SC and the projector 100 is calculated, the frame sides of the screen SC in the captured image CI are detected on the basis of the calculated angle, and the keystone distortion of the image is corrected on the basis of the detection result of the frame sides. Accordingly, in the projector 100 according to the first embodiment, since the possibility that the straight line in the captured image CI not corresponding to the frame side of the screen SC is erroneously detected as the frame side of the screen SC is reduced, it is possible to improve the precision of the keystone correction of the display image. That is, in the projector 100 according to the first embodiment, since the vanishing points DP through which the frame sides of the screen SC should pass are calculated and the frame sides of the screen SC in the captured image CI are detected from the straight lines (vanishing point-passing straight lines PL) passing through the vanishing points DP by selection, it is possible to reduce the possibility that an image of a fluorescent lamp or the like, reflected in the screen SC, in the captured image CI is erroneously detected as the frame side of the screen SC.

B. Second Embodiment

Figure 11:
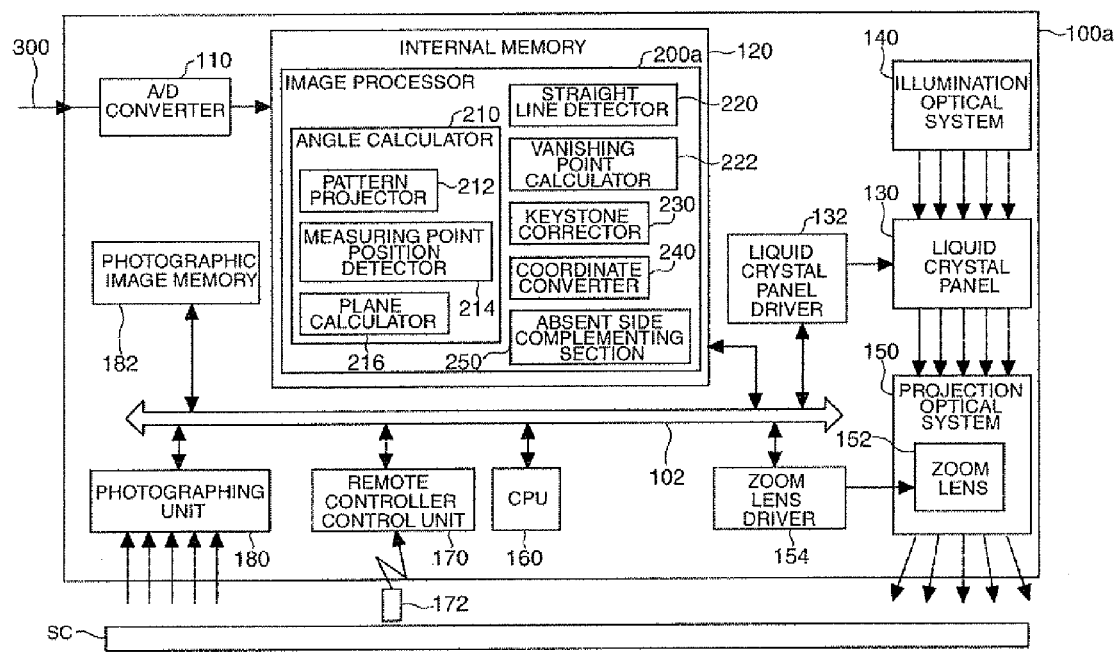
FIG. 11 is a block diagram schematically illustrating the configuration of a projector as a projection display apparatus according to a second embodiment of the invention.

FIG. 11 is a block diagram schematically illustrating the configuration of a projector as a projection display apparatus according to a second embodiment of the invention. The projector 100a according to the second embodiment is different from the projector 100 according to the first embodiment shown in FIG. 1, in that the image processor 200a includes an absent side complementing section 250. The function of the absent side complementing section 250 will be described later with the description of the keystone correcting process to be described later. The other configurations of the projector 100a according to the second embodiment are the same as the projector 100 according to the first embodiment shown in FIG. 1. The absent side complementing section 250 corresponds to the line segment complementing section in the claims.

Figure 12:
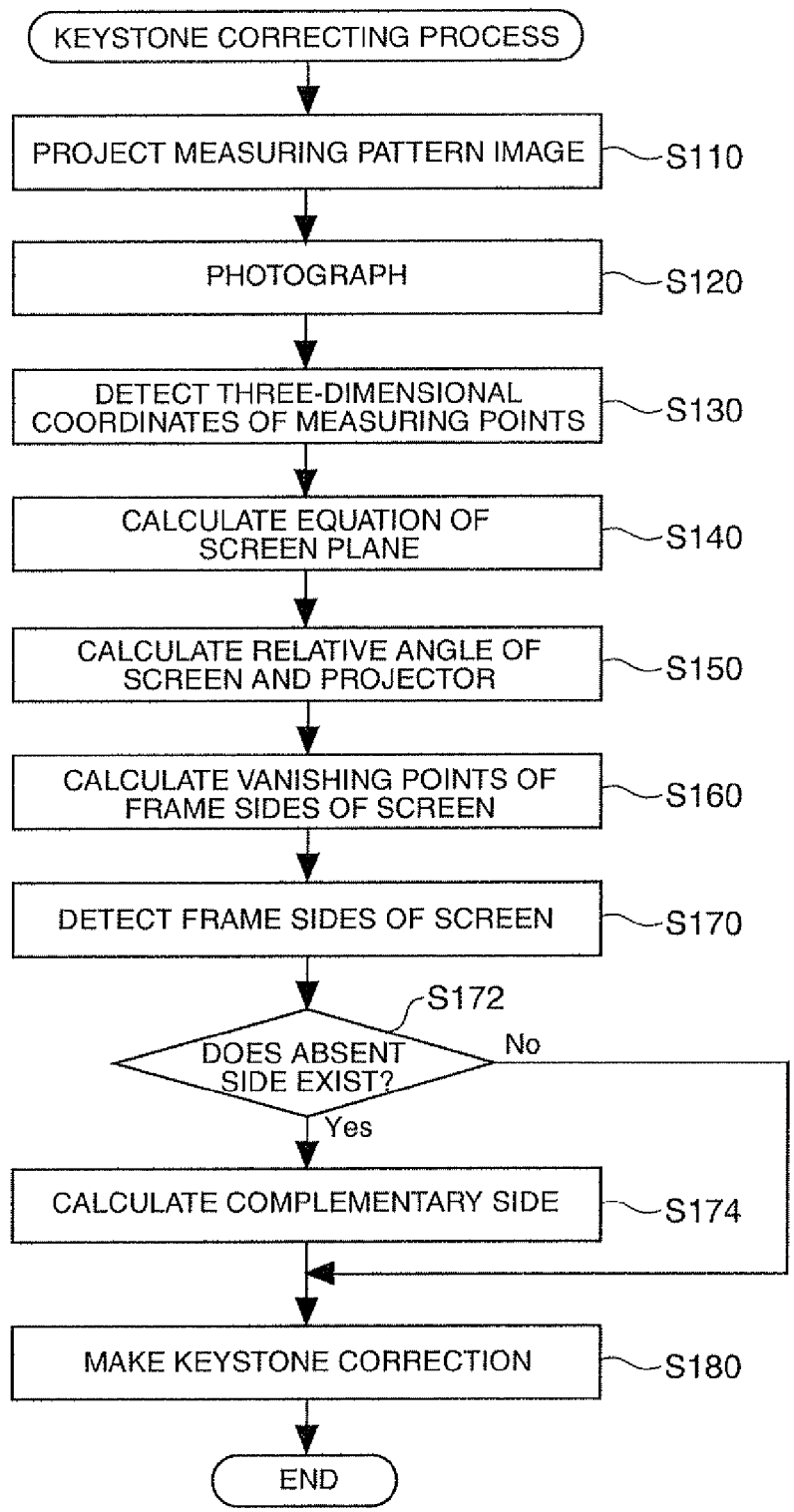
FIG. 12 is a flowchart illustrating a flow of a keystone correcting process of the projector according to the second embodiment of the invention.

FIG. 12 is a flowchart illustrating a flow of the keystone correcting process performed by the projector 100a according to the second embodiment. The process details of steps S110 to S170 in the keystone correcting process according to the second embodiment are the same as the process details of steps S110 to S170 in the first embodiment shown in FIG. 3.

In step S172 (FIG. 12), the image processor 200*a* (FIG. 11) determines whether any frame side (hereinafter, referred to as "absent side") not detected in the detection of the frame sides of the screen SC in step S170 exists. As shown in FIG. 10, as for the vertical vanishing point DPv and the horizontal vanishing point DPh, when two peak values greater than the threshold value T exist in the histogram of the edge amount integrated values along the vanishing point-passing straight lines PL passing through the vanishing points DP, all the frame sides (the right side SF(r), the left side SF(l), the top side SF(t), and the bottom side SF(b)) of the screen SC are detected. In this case, it is determined that no absent side exists (NO in step S172) and the keystone correction is carried out on the basis of the positions of the detected frame sides of the screen SC (step S180) as in the first embodiment. The detected frame sides in the captured image CI correspond to the reference line segments in the claims.

Figure 13:
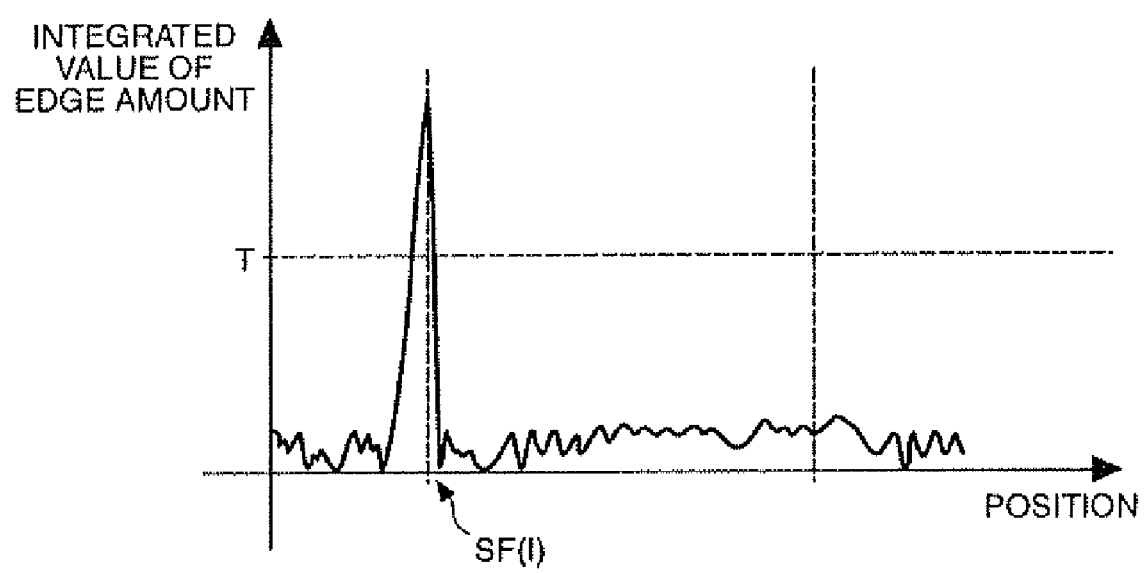
FIG. 13 is a diagram illustrating an example of a histogram of edge-amount integrated values when an absent side exists.

On the other hand, in the histogram of the edge amount integrated values along the vanishing point-passing straight lines PL passing through the vanishing points DP, two peak values greater than the threshold value T may not exist and a part of the frame sides of the screen SC may not be detected. FIG. 13 is a diagram illustrating an example of the histogram of the edge amount integrated values when any absent side exists In FIG. 13, the histogram of the edge amount integrated values along the vanishing point-passing straight line PL passing through the vertical vanishing point DPv is shown. As shown in FIG. 13, when two peak values greater than the threshold value T do not exist in the histogram of the edge amount integrated values, the position of at least one of the right side SF(r) and the left side SF(l) of the screen SC is not detected. In the example shown in FIG. 13, the position of the left side SF(l) is detected but the position of the right side SF(r) is not detected.

When any absent side exists in detecting the frame sides of the screen SC, it is considered that the absent side is not reflected in the captured image CI, that is, the absent side of the screen SC departs from the range of the angle of view of the image capturing unit 180, or the absent side of the screen SC is reflected in the captured image CI but the edge amount thereof is reduced for a certain reason and is not detected. In this way, when any absent side exists (YES in step S172), the post-correction image forming area RIF (see FIGS. 2B and 2C) cannot be calculated as it is. Accordingly, a complementary side for complementing the absent side is calculated by the absent side complementing section 250 (FIG. 11) (step S174 of FIG. 12).

Figure 14:
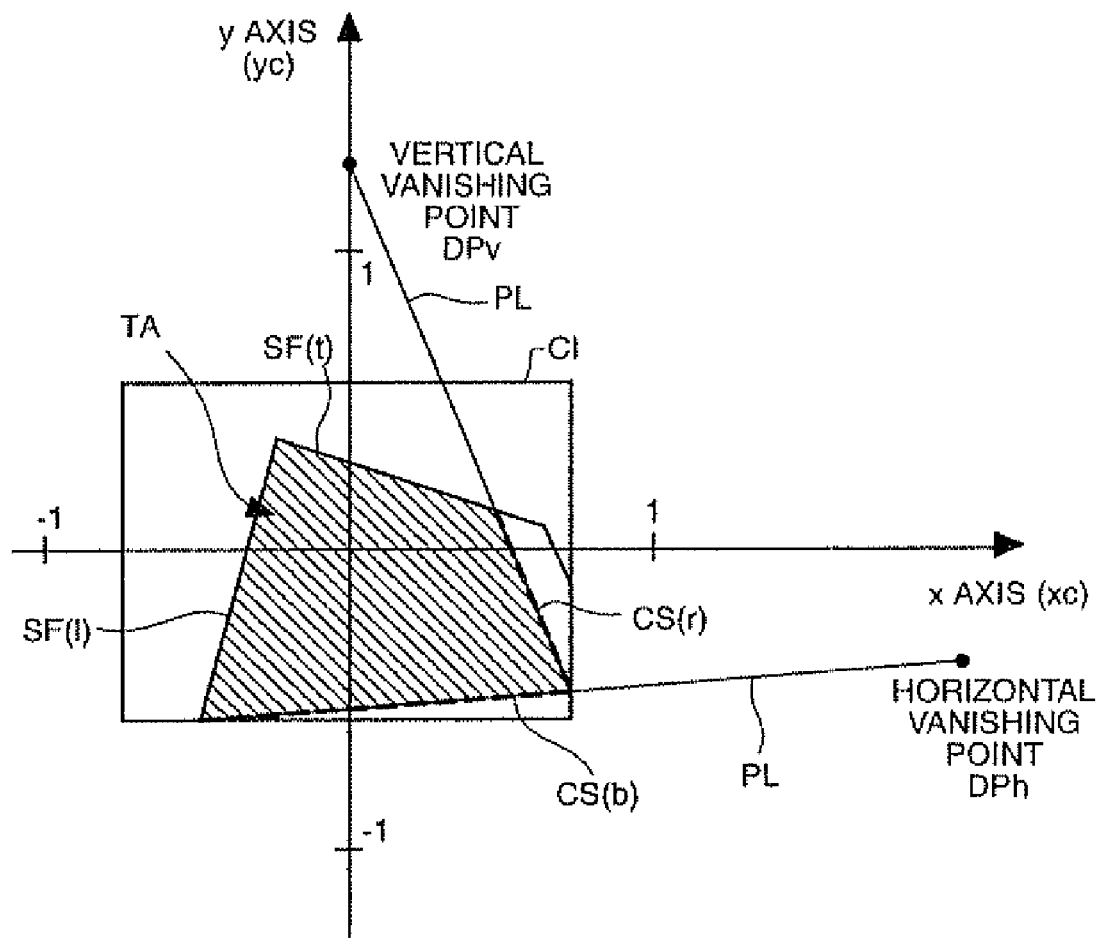
FIG. 14 is a diagram illustrating an example of a complementary side calculating method.

FIG. 14 is a diagram illustrating an example of the method of calculating a complementary side. In FIG. 14, the captured image CI and the vanishing points DP (the vertical vanishing point DPv and the horizontal vanishing point DPh) in the standard coordinate system of the camera coordinate system are shown. In the example shown in FIG. 14, the left side SF(l) and the top side SF(t) of the screen SC are detected in the captured image CI, but the right side SF(r) and the bottom side SF(b) are not detected and become the absent sides. In this case, a complementary side CS(r) for complementing the right side SF(r) and a complementary side CS(b) for complementing the bottom side SF(b) are calculated.

The absent side complementing section 250 first calculates the complementary side CS (b) for complementing the bottom side SF(b). Specifically, a portion (line segment), which is located in the area of the captured image CI, of the vanishing point-passing straight line PL connecting the horizontal vanishing point DPh and the bottom end point of the left side SF(l) is set as the complementary side CS (b). Then, the absent side complementing section 250 calculates the complementary side CS(r) for complementing the right side SF(r) Specifically, a portion (line segment), which is interposed between the top side SF(t) and the complementary side CS (b), of the vanishing point-passing straight line PL connecting the vertical vanishing point DPv and the right end of the complementary side CS(b) is set as the complementary side CS(r).

When the complementary sides CS (b) and CS (r) are set in this way, the line segment on the actual screen SC corresponding to the complementary side CS (b) is parallel to the bottom side SF(b) and the top side SF(t) of the screen SC and the line segment on the actual screen SC corresponding to the complementary side CS (r) is parallel to the right side SF(r) and the left side SF(l) of the screen SC. Therefore, the area on the actual screen SC corresponding to the area (hereinafter, also referred to as "target area TA") (hatched in FIG. 14) surrounded with the detected sides (the top side SF(t) and the left side SF(l)) and the complementary sides CS (the complementary sides CS (b) and CS (r)) is a rectangular area and the keystone distortion of the display image can be corrected by performing the keystone correction so as to display an image in the area. In step S180 subsequent to the calculating of the complementary side (step S174 of FIG. 12), this keystone correction is performed.

In the example shown in FIG. 14, the complementary side CS(b) for complementing the bottom side SF(b) is first calculated and the complementary side CS(r) for complementing the right side SF(r) is then calculated, but the order of calculating the complementary sides CS for complementing the absent sides can be set arbitrarily. In the example shown in FIG. 14, the complementary side CS(r) for complementing the right side SF(r) may be first calculated and the complementary side CS(b) for complementing the bottom side SF(b) may then be calculated. In the example shown in FIG. 14, as described above, the complementary side CS(b) for complementing the bottom side SF(b) is calculated so as to pass through the bottom end of the left side SF(l) and the complementary side CS(r) for complementing the right side SF(r) is calculated so as to pass through the right end of the complementary side CS(b), but the complementary sides CS need not be calculated in this way. However, by calculating the complementary sides CS in this way, the target area TA can be set as large as possible and thus the display image on the screen SC after the keystone correcting process can be formed as large as possible.

In the example shown in FIG. 14, two sides of the bottom side SF(b) and the right side SF(r) out of the frame sides of the screen SC are the absent sides, but the complementary sides CS when different sides are absent can be calculated in a similar way. That is, the complementary sides CS for complementing the bottom side SF(b) and the top side SF(t) can be set as line segments in the vanishing point-passing straight line PL passing through the horizontal vanishing point DPh and the complementary sides CS for complementing the left side SF(l) and the right side SF(r) can be set as line segments in the vanishing point-passing straight line PL passing through the vertical vanishing point DPv. Therefore, when only one side out of the frame sides of the screen SC is detected from the captured image CI and the other three sides are absent, the projector 100*a* according to the second embodiment can perform the keystone correcting process by calculating the complementary sides CS for complementing three absent sides. When no frame side of the screen SC is detected from the captured image CI and all four sides are absent, the projector 100*a* according to the second embodiment can perform the keystone correcting process by calculating the complementary sides CS for complementing the four absent sides.

In the second embodiment, the aspect ratio of the target area TA varies depending on the method of setting the complementary side CS. Therefore, before performing the keystone correcting process (step S180 of FIG. 12), the aspect ratio may be adjusted so that the aspect ratio of the area on the actual screen SC corresponding to the target area TA has a predetermined value. Accordingly, regardless of the method of setting the complementary side CS, it is possible to fix the aspect ratio of the display image after the keystone correction to a predetermined value (for example, 3:4).

As described above, in the projector 100a according to the second embodiment, the frame sides of the screen SC in the captured image CI are detected, the relative angle of the screen SC and the projector 100a is calculated, the complementary sides CS in the captured image CI are set so that the area on the screen SC corresponding to the area defined by the complementary sides CS and the detected sides is rectangular on the basis of the calculated angle, and the keystone distortion of the image displayed on the screen SC is corrected on the basis of the detected sides and the complementary sides CS. Accordingly, in the projector 100a according to the second embodiment, when a part or all of the frame sides of the screen SC in the captured image CI are not detected, the complementary sides for complementing the frame sides not detected are set, thereby performing the keystone correction process of the display image. Therefore, it is possible to improve the general versatility of the keystone correction on the image displayed by projection. For example, even when the projector 100a and the screen SC have a positional relation that a part of the frame sides of the screen SC is not reflected in the captured image CI, it is possible to properly perform the keystone correcting process on the display image.

C. Modified Examples

The invention is not limited to the above-mentioned embodiments or examples, but may be modified in various forms without departing from the spirit and scope of the invention. For example, the following modifications can be made.

C-1. Modified Example 1

Figure 15:
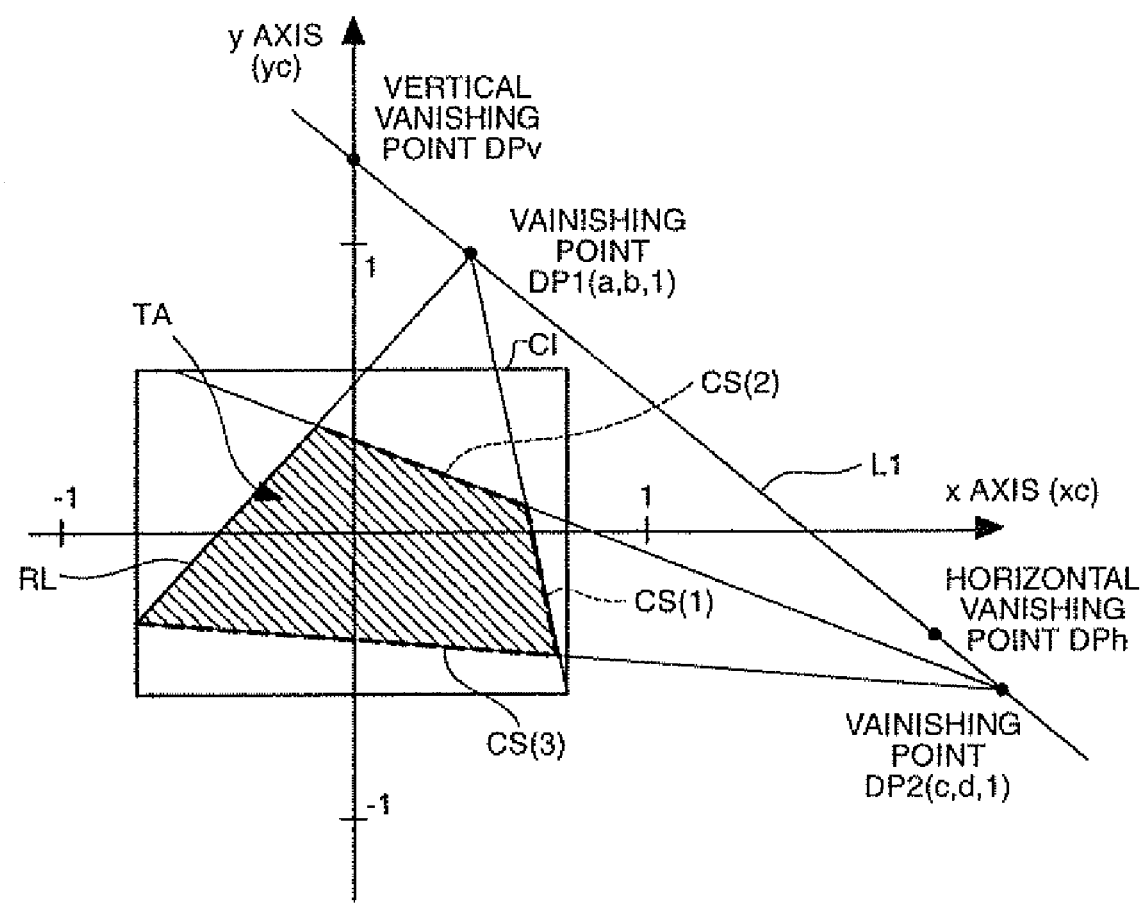
FIG. 15 is a diagram illustrating a keystone correcting method according to a modified example.

In the second embodiment, the keystone correcting process of setting the area, which is surrounded by the frame sides of the screen SC detected from the captured image CI and the complementary sides CS for complementing the frame sides not detected as the target area TA and displaying an image in the area on the actual screen SC corresponding to the target area TA is performed. However, the keystone correcting method is not limited to it. FIG. 15 is a diagram illustrating a keystone correcting method according to a modified example. In the modified example shown in FIG. 15, the keystone correction is performed so that an image is displayed in a rectangular area having as one side a line segment on the screen SC corresponding to a line segment (hereinafter, referred to as "reference line segment RL") detected or set in the captured image CI. Here, the reference line segment RL is detected or set arbitrarily and the line segment on the screen SC corresponding to the reference line segment RL cannot be said to be perpendicular or parallel to the frame sides of the screen SC. Therefore, the sides of the rectangular area in which an image is displayed after the keystone correction cannot be said to be perpendicular or parallel to the frame sides of the screen SC.

In the modified example shown in FIG. 15, similarly to the second embodiment, the coordinate of the vertical vanishing point DPv at which the right side SF(r) and the left side SF(l) of the screen SC are intersected in the captured image CI and the coordinate of the horizontal vanishing point DPh at which the top side SF(t) and the bottom side SF(b) of the screen SC are intersected are calculated.

Here, it is known that all the vanishing points are located in the same straight line in the standard coordinate system. Therefore, when it is assumed that the straight line connecting the vertical vanishing point DPv and the horizontal vanishing point DPh is a straight line L1, an intersection of the extension line of the reference line segment RL and the straight line L1 becomes the vanishing point (hereinafter, referred to as "first vanishing point DP1") of the reference line segment RL. That is, the straight line on the actual screen SC corresponding to the straight line passing through the first vanishing point DP1 in the captured image CI is parallel to the straight line on the screen SC corresponding to the reference line segment RL. Therefore, for example, as shown in FIG. 15, a part (line segment) of the straight line passing through the first vanishing point DP1 is set as a complementary side CS(1).

A vanishing point (hereinafter, referred to as "second vanishing point DP2"), through which the straight line in the captured image CI corresponding to a straight line perpendicular to the line segment corresponding to the reference line segment RL, should pass is calculated in the actual screen SC. The second vanishing point DP2 is located in the straight line L1, similarly to the first vanishing point DP1. When it is assumed that the three-dimensional coordinate of the first vanishing point DP1 is (a, b, 1) and the three-dimensional coordinate of the second vanishing point DP2 is (c, d, 1), Expression (5) is established. Therefore, the coordinate of the second vanishing point DP2 can be uniquely calculated from the coordinates of three vanishing points (the vertical vanishing point DPv, the horizontal vanishing point DPh, and the first vanishing point DP1) in the captured image CI. A part (line segment) of the straight line passing through the second vanishing point DP2 is set as the complementary sides CS(2) and CS(3).

$$ac+bd+1=0 \qquad (5)$$

As shown in FIG. 15, the area surrounded by the reference line segment RL and three complementary sides CS is set as the target area TA. The area on the actual screen SC corresponding to the set target area TA is rectangular. Therefore, even when the target area TA is set by the method shown in FIG. 15, it is possible to correct the keystone distortion of an image displayed on the screen SC by performing the keystone correcting process so that the image is displayed in the area on the actual screen SC corresponding to the set target area TA.

C-2. Modified Example 2

In the above-mentioned embodiments, the three-dimensional coordinates are detected using the reference points RP included in the displayed measuring pattern image PT, as the measuring points and the equation of the approximate plane of the screen SC is calculated on the basis of the detected three-dimensional coordinates of the reference points RP. However, the measuring points of which the three-dimensional coordinates should be detected may not be the reference points RP. For example, when the screen SC has points which can be used as the measuring points like the marked vertexes of the peripheral frame of the screen SC, the three-dimensional coordinates of the points may be detected and the equation of the approximate plane of the screen SC may be calculated on the basis of the detection result. In this case, it is not necessary to project the measuring pattern image PT.

Although the three-dimensional coordinates of the measuring points are detected using the principle of triangulation by the use of the image capturing unit 180 in the above-mentioned embodiments, a distance sensor may be used to detect the coordinates.

In the above-mentioned embodiments, the equation of the approximate plane of the screen SC is calculated to calculate the relative angle of the screen SC and the projector 100. However, the projection angle (the yaw angle φ) in the horizontal direction may be calculated by calculating the distance between two or more measuring points on the screen SC using a distance sensor and the projection angle (the pitch angle θ) in the vertical direction may be calculated using an acceleration sensor.

C-3. Modified Example 3

In the above-mentioned embodiments, the frame sides of the screen SC in the captured image CI are detected by detecting the peak values in the histogram of the edge amount integrated values along the vanishing point-passing straight line PL, but the frame sides of the screen SC may be detected using other methods. For example, candidates of the frame sides of the screen SC may be extracted by extracting pixels having a high contrast ratio in the captured image CI and the frame sides of the screen SC may be detected by determining whether the candidates of the frame sides of the screen SC are located in the vanishing point-passing straight line PL. The frame sides of the screen SC may be detected by extracting a straight line in the captured image CI using the Hough transformation and determining whether the extracted straight line passes through the vanishing points DP.

C-4. Modified Example 4

In the above-mentioned embodiments, the coordinate system used to detect the three-dimensional coordinates of the measuring points and to calculate the vanishing points of the frame sides of the screen SC is only an example. The coordinate system used in the processes can be established arbitrarily and for example, the camera coordinate system may be used instead of the lens coordinate system to detect the three-dimensional coordinates of the measuring points. In the above-mentioned embodiments, the coordinate conversion is performed between the standard coordinate system of the lens coordinate system and the standard coordinate system of the camera coordinate system to compensate for the difference between the optical axis of the zoom lens 152 and the optical axis of the lens of the image capturing unit 180 in the projector 100. However, by considering that the difference between the optical axes is small, the coordinate conversion may be omitted.

C-5. Modified Example 5

Although the screen SC is used as the projection plane in the above-mentioned embodiments, a thing other than the screen SC may be used as the projection plane. For example, when a wall of a room is white, a rectangular frame with a black line may be drawn on the wall using a tape or a coating and the wall may then be used as the projection plane. Alternatively, a rectangular frame may be drawn on a white board with a black line marker and the white board may be used as the projection plane.

The colors of the projection plane are not limited to the black frame and the white areas inside and outside the frame, but the frame may be white and the areas inside and outside the frame may be black. For example, a rectangular frame may be drawn on a black board with a white chalk and the black board may be used as the projection plane. The colors of the projection plane are not limited to white and black, but the color of the frame and the color of the area inside and outside the frame may be any combination of colors, as long as the colors have a desired contrast ratio.

In the above-mentioned embodiments, the frame sides of the screen SC in the captured image CI are detected and the keystone correction is made on the basis of the detected frame sides of the screen SC. However, straight lines other than the frame sides of the screen SC in the captured image CI and perpendicular or parallel to the installation plane SS (see FIG. 6) may be detected and the keystone correction may be made on the basis of the detected straight lines. For example, when an outline for specifying a rectangular area is prepared inside the frame sides of the screen SC, the outline in the captured image CI may be detected and the keystone correction may be made on the basis of the outline.

In the above-mentioned embodiments, the frame sides of the screen SC which are the straight lines perpendicular or parallel to the reference plane are detected using the installation plane SS as the reference plane, but a plane other than the installation plane SS may be used as the reference plane. For example, another plane (for example, the bottom surface or the top surface of the chassis of the projector 100) having a predetermined relation with the projector 100 may be used as the reference plane. In this case, images of the straight lines perpendicular or parallel to the reference plane are detected from the captured image CI and the keystone correction is made on the basis of the detected straight lines.

C-6. Modified Example 6

In the above-mentioned embodiments, the projector 100 has only one liquid crystal panel 130, but the projector 100 may have plural liquid crystal panels 130 corresponding to plural color components. The projector 100 may have an electro-optical device (for example, DMD (the trademark of Texas Instruments Inc.)) other than the liquid crystal panel. The projector 100 may be a CRT projector. The invention is not limited to the projector 100, but may be applied to general projection display apparatuses for displaying an image on a projection plane by projection.

C-7. Modified Example 7

In the above-mentioned embodiments, the image capturing unit 180 includes a CCD camera. However, the image capturing unit 180 may include a different photographing device such as a CMOS camera as long as it can generate a captured image.

C-8. Modified Example 8

In the above-mentioned embodiments, the projector 100 includes the zoom lens 152 and the zoom lens driver 154, but the projector 100 may not necessarily include a lens having a zoom function. The projector 100 may include a single focus lens of which the focal length is fixed.

C-9. Modified Example 9

In the above-mentioned embodiments, a part of the configuration embodied by hardware may be replaced with software, or a part of the configuration embodied by software may be replaced with hardware.

When a part or all of the functions of the invention are embodied by software, the software (computer programs) can be provided in the state where it is stored in a computer-readable recording medium. In the invention, the "computer-readable recording medium" is not limited to a portable recording medium such as a flexible disk or a CD-ROM, but may include internal memory devices of a computer such as various RAMs or ROMs or external memory devices such as a hard disk fixed to the computer.

The entire disclosure of Japanese Patent Application No. 2008-210803, filed Aug. 19, 2008 is expressly incorporated by reference herein.

What is claimed is:

1. A projection display apparatus for displaying an image on a projection plane by projection, comprising:
    an image capturing unit capturing an image;
    an angle calculator calculating an angle of the projection plane relative to the projection display apparatus;
    a straight line detector detecting two straight lines at a left side and a right side of a frame of the projection plane having the largest integrated value of values correlated with an edge amount along the corresponding straight line out of the straight lines passing through a vertical vanishing point in the captured image, and two straight lines at a top side and a bottom side of the frame of the projection plane having the largest integrated value of values correlated with an edge amount along the corresponding straight line out of the straight lines passing through a horizontal vanishing point in the captured image; and
    a keystone corrector correcting a keystone distortion of an image to be displayed on the projection plane on the basis of the detection result in the straight line detector.

2. The projection display apparatus according to claim 1, wherein the straight line detector includes a vanishing point calculator calculating the vertical vanishing point through which a straight line in the captured image corresponding to a line perpendicular to the predetermined reference plane passes and the horizontal vanishing point through which a straight line in the captured image corresponding to a line parallel to the predetermined reference plane passes on the basis of the calculated angle.

3. The projection display apparatus according to claim 2, wherein the straight line detector detects the straight lines in the captured image corresponding to the left side and the right side from the straight lines passing through the vertical vanishing point in the captured image by selection and detects the straight lines in the captured image corresponding to the top side and the bottom side from the straight lines passing through the horizontal vanishing point in the captured image by selection.

4. The projection display apparatus according to claim 1, wherein the angle calculator includes:
    a measuring point position detector detecting positions of three or more predetermined measuring points on the projection plane relative to the projection display apparatus; and
    a plane calculator calculating an approximate plane approximating the projection plane on the basis of the positions of the predetermined measuring points.

5. The projection display apparatus according to claim 4, wherein the angle calculator further includes a pattern projector projecting a predetermined pattern image including three or more reference points onto the projection plane,
    wherein the predetermined measuring points are the reference points of the pattern image displayed on the projection plane.

6. The projection display apparatus according to claim 1, wherein the predetermined reference plane is a plane having a predetermined relation with the projection display apparatus.

7. The projection display apparatus according to claim 6, wherein the predetermined reference plane is an installation plane of the projection display apparatus.

8. The projection display apparatus according to claim 1, further comprising:
    a light source unit emitting light; and
    an image forming panel unit forming an effective panel image, which is used to modulate the light emitted from the light source unit to an effective image beam indicating an image, in an image forming area of a panel surface,
    wherein the keystone corrector corrects the keystone distortion of the image displayed on the projection plane by calculating a post-correction image forming area, which is a partial area of the image forming area, and forming the effective panel image in the post-correction image forming area of the image forming area on the basis of the detection result in the straight line detector.

9. A display method of displaying an image on a projection plane by projection, comprising:
    (a) capturing an image;
    (b) calculating an angle of the projection plane relative to the optical axis of the projection;
    (c) detecting two straight lines at a left side and a right side of a frame of the projection plane having the largest integrated value of values correlated with an edge amount along the corresponding straight line out of the straight lines passing through a vertical vanishing point in the captured image, and two straight lines at a top side and a bottom side of the frame of the projection plane having the largest integrated value of values correlated with an edge amount along the corresponding straight line out of the straight lines passing through a horizontal vanishing point in the captured image; and
    (d) correcting a keystone distortion of an image to be displayed on the projection plane on the basis of the detection result of the straight lines.

* * * * *